United States Patent [19]
Piasecki

[11] Patent Number: 5,188,313
[45] Date of Patent: Feb. 23, 1993

[54] GLIDER AIRCRAFT TOW CONTROL SYSTEM

[75] Inventor: Frank N. Piasecki, Haverford, Pa.

[73] Assignee: Piasecki Aircraft Corporation, Essington, Pa.

[21] Appl. No.: 816,721

[22] Filed: Jan. 3, 1992

[51] Int. Cl.$^5$ .................. B64C 37/02; B64D 3/00; B64D 39/00
[52] U.S. Cl. .................................... 244/3; 114/246; 244/135 A
[58] Field of Search .................. 244/2, 3, 213, 135 A, 244/90 R, 90 A, 75 R; 114/246

[56] References Cited

U.S. PATENT DOCUMENTS

| | | | |
|---|---|---|---|
| 2,385,392 | 9/1945 | Van Dusen | 244/3 |
| 2,476,301 | 7/1949 | Jenks | 244/3 |
| 4,014,481 | 3/1977 | Daikeler et al. | 244/3 |
| 4,674,710 | 6/1987 | Rodriguez | 244/3 |

FOREIGN PATENT DOCUMENTS 578862  7/1946  United Kingdom .................. 244/3

OTHER PUBLICATIONS

McKenzie, WO88/05395, Pub S.R. Jul. 28, 1988.

Primary Examiner—Galen Barefoot
Attorney, Agent, or Firm—Willard M. Hanger

[57] ABSTRACT

The towed glider flight control system of the invention has a towing frame interconnecting and pivotally connected at each end to the towed glider and the towing aircraft. Sensors measuring the angular relationships between the towing frame and the towed glider and the rage of change in these relationships and sensors measuring flight conditions of the glider and towing aircraft are connected to the input of a computer of which the output connects to the glider aerodynamic control surface. The computer determines differences between sensor sensed parameter values existing when a selected spatial geometric relationship exists between the glider and towing aircraft and sensor parameter values received by the computer from the sensors and from these differences the computer calculates motions required of the glider aerodynamic flight path control surfaces to establish a glider flight which establish and maintain the selected spatial geometric relationship of the glider and towing aircraft.

7 Claims, 4 Drawing Sheets

GLIDER AIRCRAFT TOW CONTROL SYSTEM

BACKGROUND OF THE INVENTION

This invention relates to a system for establishing and controlling the spatial geometric relationship between a powered towing aircraft and a towed fixed wing glider (unpowered) aircraft during airborne flight conditions.

The airlifting load capabilities of a powered aircraft can be increased if a fixed wing glider aircraft carrying additional load is attached to and towed in flight by the powered aircraft. Airborne towing systems involving a powered towing aircraft connected through a towing cable to an unpowered glider carrying a payload, such as additional personnel, have long been utilized. However, in such systems the glider must carry a pilot who controls the spatial geometric relationship between the towing aircraft and the glider by operating conventional aerodynamic control surfaces of the glider.

A particularly useful aspect of increasing the airlifting load capabilities of both fixed wing and rotary wing powered aircraft would be to have the powered aircraft tow a glider carrying additional fuel which could extend the endurance and range of the towing ("drinking") aircraft or to utilize the towed glider as a tanker from which other aircraft could be refueled in the air. Studies indicate that a towed glider loaded with fuel could quadruple the time on station of a Navy P-3C Orion aircraft due to the additional fuel carried by the towing glider doubling the fuel available to the P-3C Orion aircraft. A fuel loaded glider towed by a rotary wing aircraft would have increased utility over that towed by a fixed wing aircraft since a helicopter has aerodynamic relatively short range characteristics because of its low lift to drag ratio in contrast to the much greater lift to drag ratio of a fixed wing glider being towed by the low lift-drag ratio helicopter.

The optimum position of a towed glider during normal flight is above and behind the towing aircraft to be clear of the downwash of the towing aircraft. The glider must be raised to this position from its takeoff position below that of the towing aircraft. Maintenance of a safe as well as an optimum spatial geometric relationship between the towing aircraft and the load carrying towed glider is essential during airborne flight. The spatial relationship between the towing and towed aircraft is particularly crucial when the glider is being towed by a rotary wing aircraft to ensure that the towing connection is maintained free of the rotational path of the towing helicopter rotor blades. Utilizing a pilot in the glider to maintain the required spatial relationship between the towing and towed aircraft involves a weight penalty and has a further disadvantage that the pilot's visual reference may not be sufficient in night or low visibility operations to maintain the glider at a safe elevated position with respect to a towing rotary wing aircraft. Further, in a number of types of operations, such as utilizing the towed glider to carry additional fuel, operational conditions might require the glider be cut loose or destroyed in flight which precludes utilizing a pilot for the glider. The problem to which this invention is directed is that of establishing a towing arrangement and a remote aerodynamic control system for the glider which will maintain the glider at a safe and optimum spatial geometric relationship to the towing aircraft and at an optimum angle of attack while in airborne flight.

SUMMARY OF THE INVENTION

The basic aspect of the invention in establishing and maintaining the desired spatial geometric relationship in flight between a towing and towed aircraft involves a close coupled rigid frame pivotally interconnecting the two aircraft and displacement sensors measuring the angular relationship and rate of change in this relationship between the towing frame and the towing aircraft and the glider, as well as supplementary flight condition sensors (e.g., air speed, rate of change of altitude, tow frame tension, etc.) which are connected to the input of a computer that generates appropriate output signals actuating appropriate aerodynamic control surfaces of the glider to the degree necessary to maintain the desired spatial geometric relationship between the towing and towed aircraft. The geometric position of each aircraft is measured relative to the connecting towing frame. For a given geometric position of the aircraft to the towing frame, a calculation can be made of the relative position of the two aircraft to each other. Both the towing and the towed aircraft (glider) have aerodynamic control surfaces by which their respective flight paths and attitude are controlled and altered. Any deviation from a selected relative position of the two aircraft to each other is measured by the displacement sensors on the towing frame, including rate of change from the selected relative positions and these motions and acceleration signals are integrated in a computer (in the towing aircraft) which determines the amount of motion required by the respective aerodynamic control surfaces of the glider to return the glider to and maintain its desired position relative to the towing aircraft. An important aspect of the invention involves utilizing the upper wing spoilers and wing flaps of the glider as primary aerodynamic control surfaces in controlling the critical vertical relationship between the two aircraft. If the vertical relationship between the towing aircraft and the glider increases, i.e. the boom angle with the towing aircraft (the vertical angle between the towing frame or boom and the towing aircraft axis) increases, appropriate aerodynamic controls of the glider must immediately be actuated in lowering the position of the glider relative to the towing aircraft, particularly when the towing aircraft is a helicopter and contact between the towing frame and the glider rotor must be avoided. If the towing aircraft boom angle increases, operation of the glider elevator surface to cause the glider to pitch down would not suffice since this would not immediately materially affect the towing aircraft boom angle such as would immediately effect a reduction in the increased vertical separation between the two aircraft. Hence, a primary aerodynamic control utilized to counteract an increase in vertical separation of the two aircraft involves operating the upper wing spoilers of the glider as would reduce glider lift and initiate an immediate decrease in altitude of the glider with respect to the towing aircraft. Conversely, if the vertical separation between the aircraft decreases, a change in the pitch attitude of the glider would not immediately materially affect the boom angle of the towing aircraft, hence initiating a lowering operation of the glider flaps to increase wing lift is required as would immediately initiate an increase in the glider's altitude so as to reestablish the desired vertical separation between the two aircraft.

DESCRIPTION OF PREFERRED EMBODIMENTS OF THE INVENTION

Figures 1, 5:
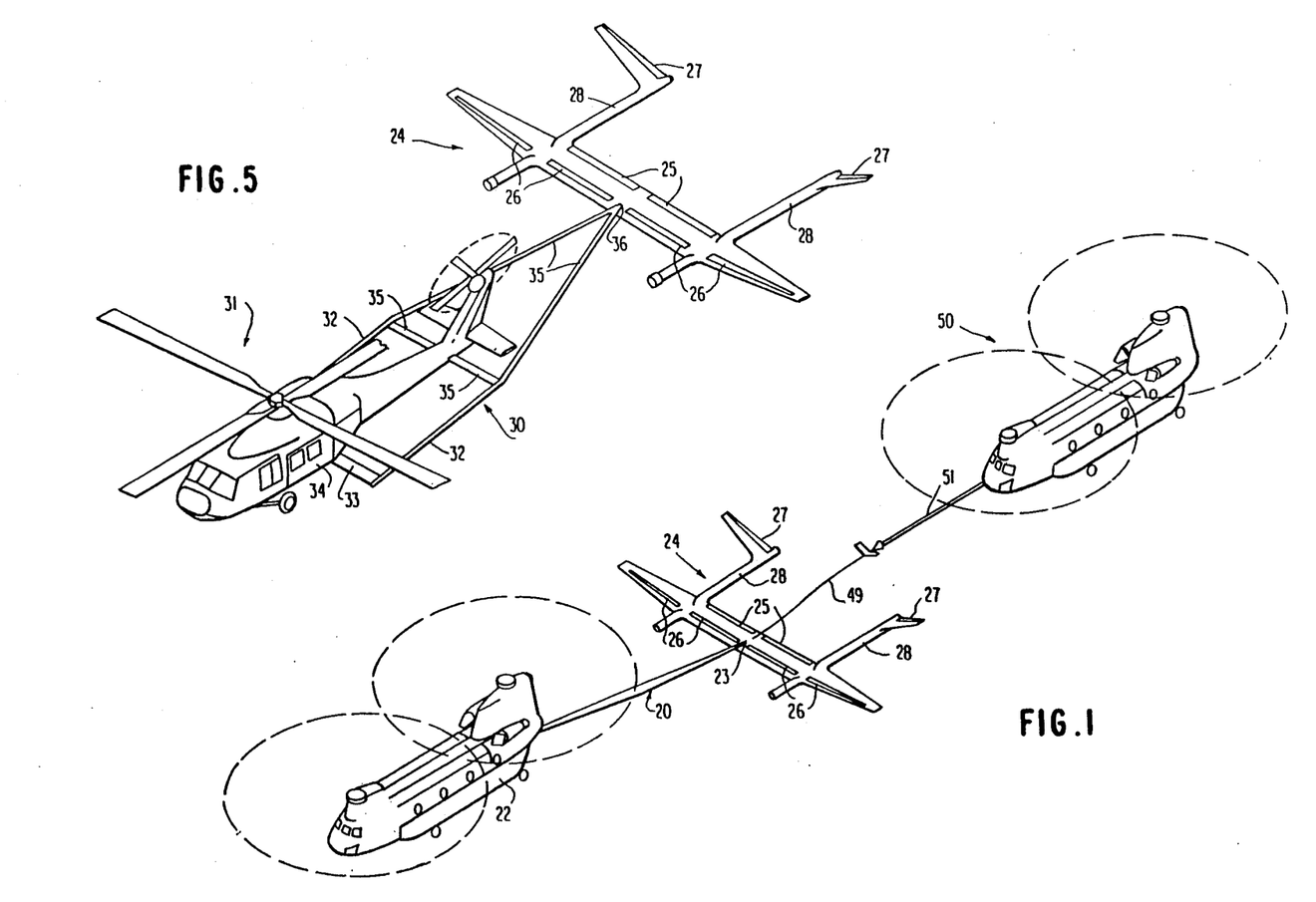
FIG. 1 is a perspective illustration of a single point end attachment towing frame interconnecting a dual rotor towing helicopter and a towed glider deploying a refueling hose to a second helicopter.
FIG. 5 is a perspective illustration of a single rotor towing helicopter and a glider connected by a dual point end connection towing frame.
Figure 2:
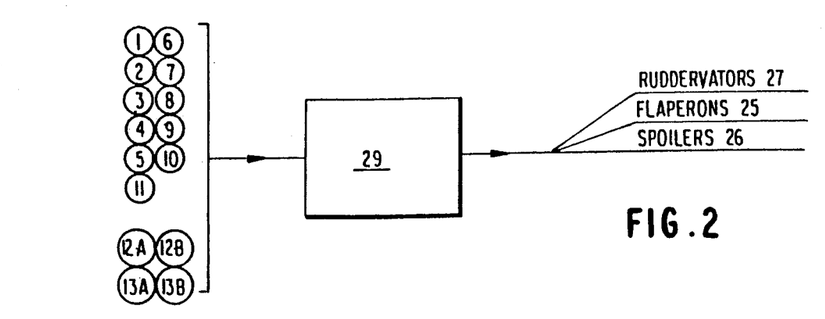
FIG. 2 is a schematic diagram of a sensor operated glider flight control system.
Figure 3:
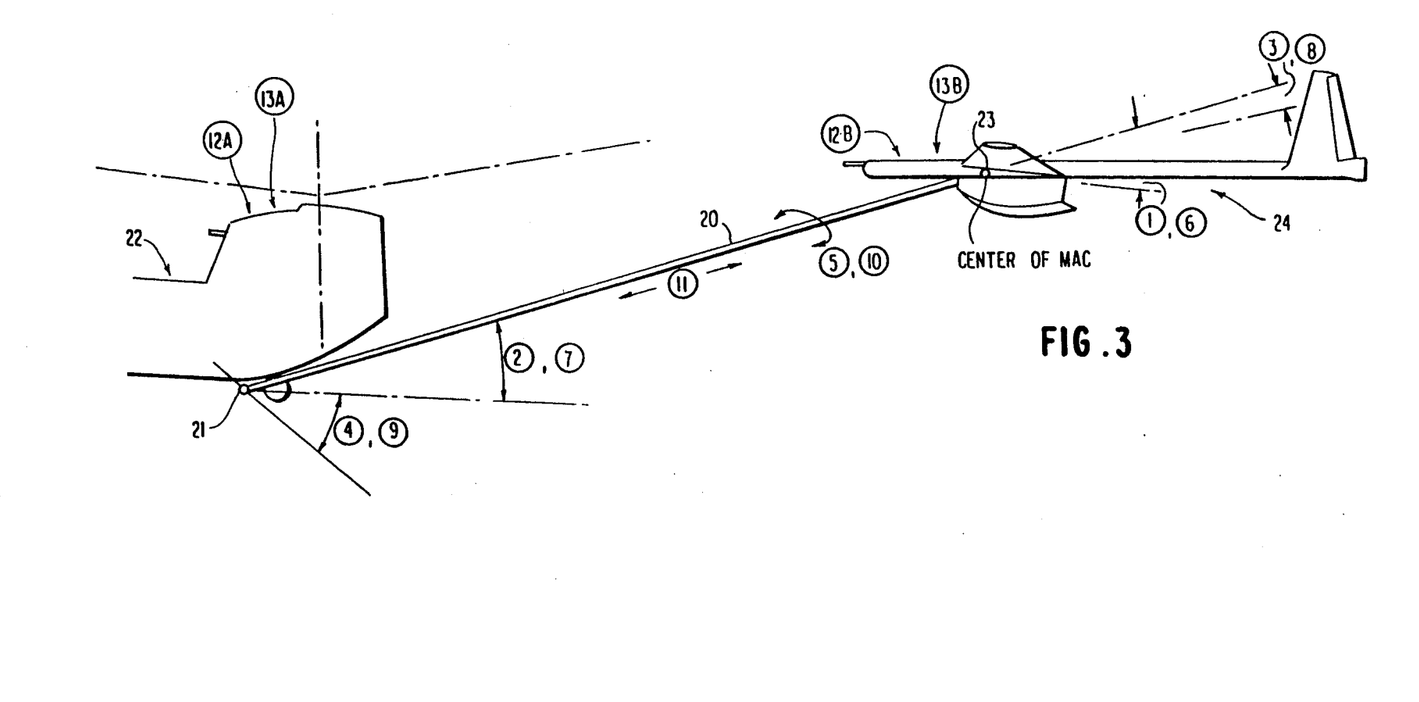
FIG. 3 is a schematic diagram illustrating an arrangement of the sensors of FIG. 2 for a single point end attachment towing frame.

Referring first to FIGS. 1 and 3, the forward end of a rigid single point end connection towing frame 20 is pivotally connected by a fully pivoting universal connection 21 to the bottom of the towing helicopter fuselage 22 below the rear ramp hinge line in line with the center of gravity of the helicopter. The rear end of the towing frame 20 connects through a universal joint 23 to the hook-on point of the glider 24 at the mean aerodynamic chord projected along the centerline of the wing of the glider. The fifteen control system sensors identified in the drawings by the circled numerals (1) through (11), (12A), (12B), (13A) and (13B) appearing in FIG. 2 of which the locations are indicated on FIG. 3, sense the following displacements or conditions:

(1) Elevation angle between the tow frame and the centerline of the glider MAC at the hook-on point of the glider to the tow frame.

(2) Elevation angle between the tow frame and the longitudinal axis of the towing aircraft at the hook-on point of the towing aircraft to the tow frame.

(3) Azimuth angle between the tow frame and the glider longitudinal axis at the hook-on point of the glider to the tow frame (only for single point attachment of tow frame and the glider).

(4) Azimuth angle between the tow frame and the longitudinal axis of the towing aircraft at the hook-on point attachment of the towing aircraft to the towing frame (only in single point attachment of towing frame to towing aircraft).

(5) Roll angle of the towing frame to the span axis of the glider wing (only in single point attachment of the glider to the towing frame).

(6) Rate of change of (1).

(7) Rate of change of (2).

(8) Rate of change of (3).

(9) Rate of change of (4).

(10) Rate of change of (5).

(11) Tension in tow frame.

(12A) Air speed of towing aircraft.

(12B) Air speed of glider.

(13A) Rate of climb of towing aircraft.

(13B) Rate of climb of glider.

The fixed wing glider 24 utilizes conventional aerodynamic flight path control surfaces for controlling attitude in pitch, roll and yaw and wing airflow pattern affecting wing lift. In the preferred embodiment illustrated and described herein the three basic aerodynamic flight path control surfaces of the glider are flaperons 25, upper wing surface spoilers 26 and ruddervators 27 mounted on each of the two tail booms 28. The twin tail boom configuration incorporating ruddervators illustrated in FIGS. 1 and 5-7 is a preferred embodiment in the event the glider is intended to be utilized as a tanker for refueling other aircraft as illustrated in FIG. 1. Elevator motion of the ruddervators 27 controls attitude in pitch, rudder motion of the ruddervators 27 controls attitude in yaw, differential deflecting motions of opposite flaperons 25 controls attitude in roll, simultaneous downward deflecting motion of both flaperons 25 increases wing lift and simultaneous actuation of the spoilers 26 increases drag resulting in a decrease of speed and decreases wing lift establishing a descent in altitude. Obviously, other conventional aircraft aerodynamic control surfaces could be used such as conventional elevators, rudders, ailerons, etc. to control attitude in pitch, yaw and roll. Placement of the aerodynamic control surfaces and their moments relative to the center of gravity of the glider and aerodynamic lift center should be such that a minimum of upsetting secondary moments are applied. This is particularly true of the spoilers 26 which should be positioned so as not to produce longitudinal moments but directly reduce the lift vector when raised. When the flaps are lowered to increase the glider lift coefficient the ruddervators should also be deflected to provide a compensating moment in pitch in order to maintain the optimum pitch attitude of the glider.

Figure 4:
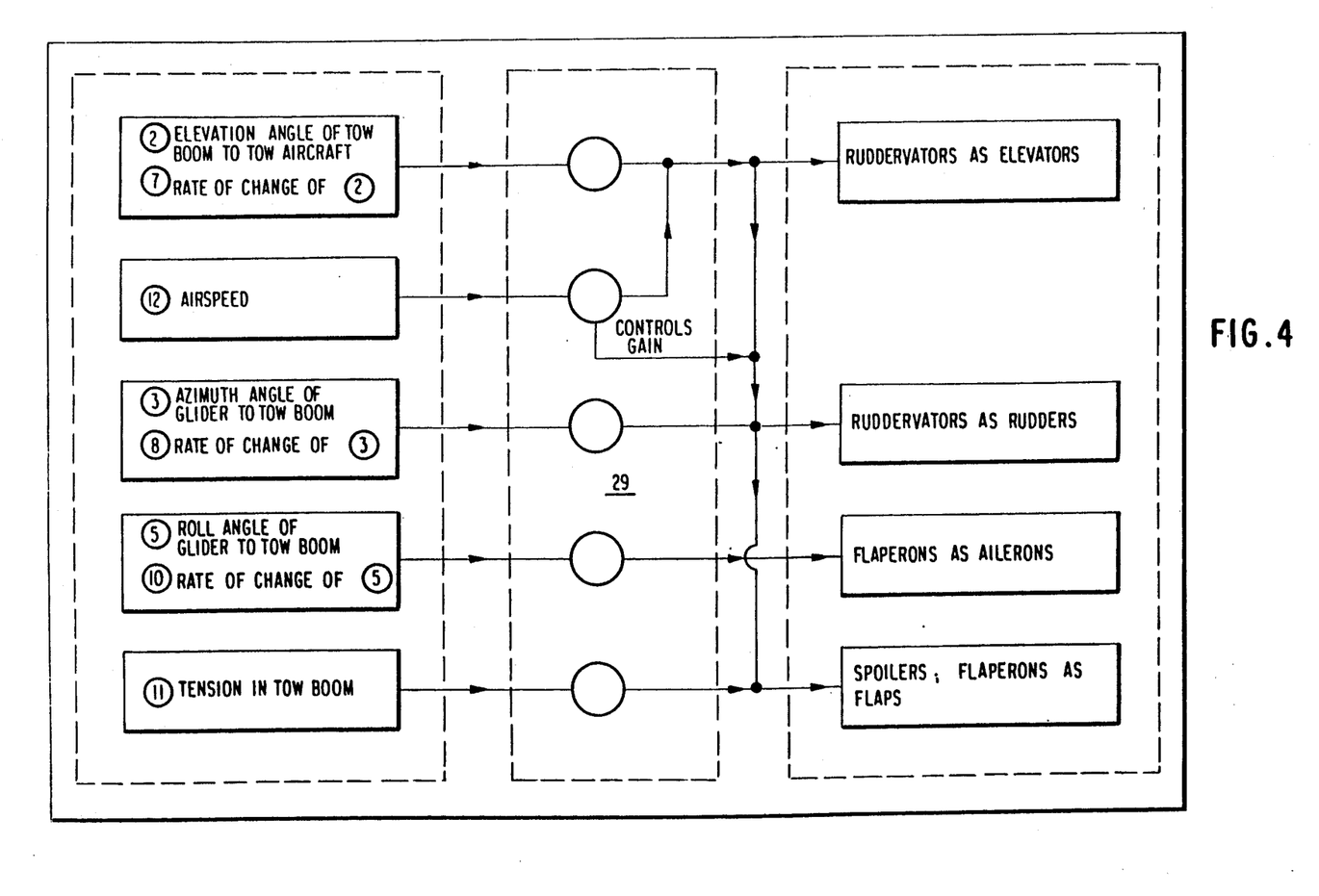
FIG. 4 is a schematic block diagram indicating a typical actuational relationship between flight control sensors, a flight control computer and glider aerodynamic flight path control surfaces, for one preferred embodiment.

Optimum flight path control of the towed glider is maintained by incorporating a high degree of static stability into the glider about its roll and yaw axes and establishing an automatic operation of appropriate glider aerodynamic flight path control surfaces by output signals to the glider flight path control surface actuators from a flight control computer 29 generated from input signals to the computer from various displacement and condition measuring sensors schematically illustrated in FIG. 2 in the manner subsequently described in more detail with respect to FIG. 4. To maintain the all-important vertical altitude relationship between the towing and towed aircraft, the displacement sensors (1) and (2), measuring the angle between the towing frame and the towing aircraft longitudinal axis, and the towing frame and the glider longitudinal axis and the sensors (6) and (7), measuring the rate of change of these angles, are integrated by the computer into signals that operate the primary altitude controlling aerodynamic surfaces comprising the spoilers 26 and the flaperons 25 as discussed subsequently in more detail with respect to the block diagram of FIG. 4. Signals generated by the conditioning measuring sensors involving air speed (12A) and (12B), rate of climb (13A) and (13B) and tow frame tension (1;) are integrated by the flight control computer into supplementary aerodynamic control surface actuations as discussed more specifically with respect to FIG. 4.

Figures 6, 7:
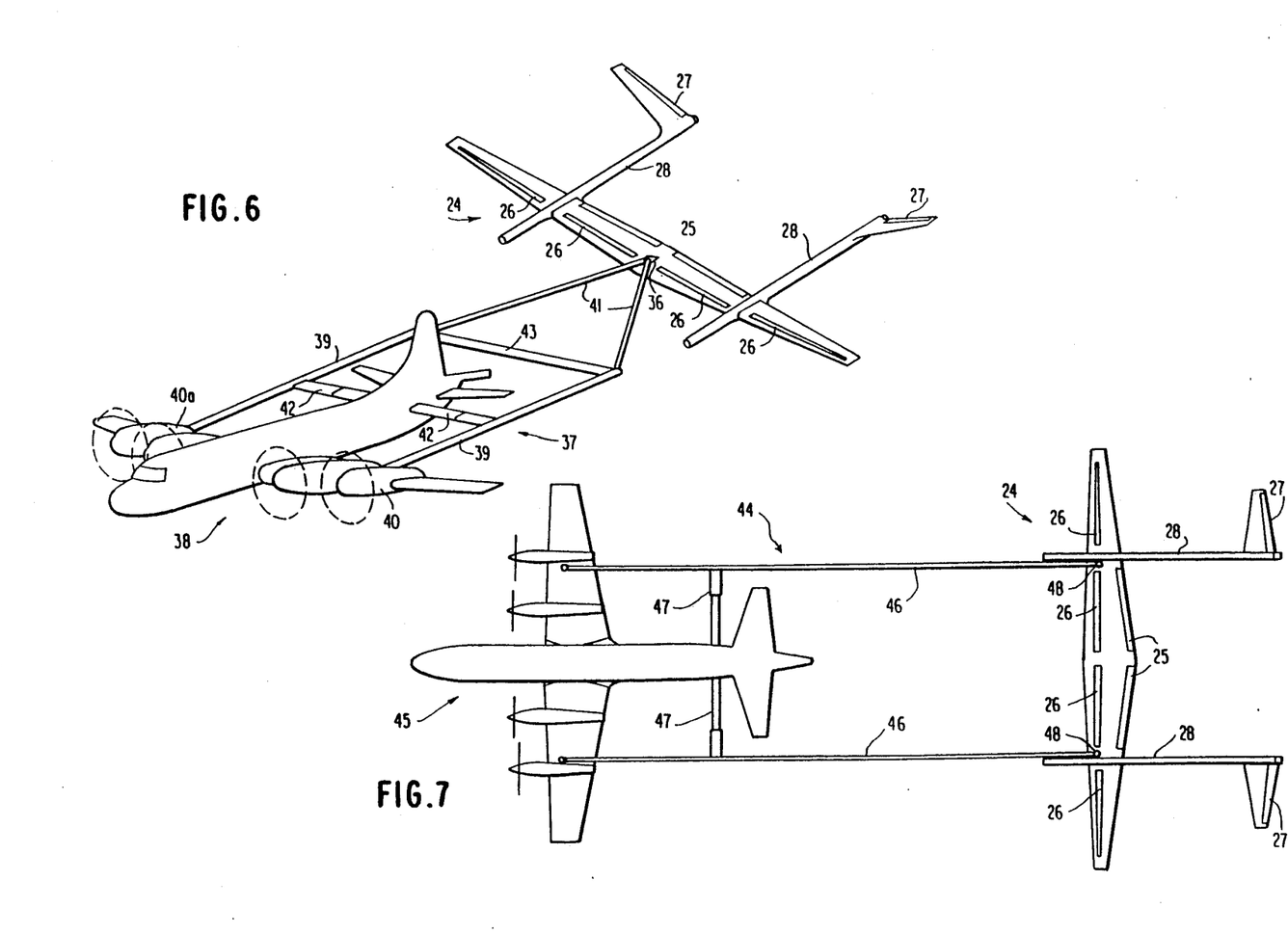
FIG. 6 is a perspective illustration of a fixed wing towing aircraft and a glider connected by a dual point end connection towing frame.
FIG. 7 is a plan view of a fixed wing towing aircraft and a glider connected by a double dual end point connection towing frame.

Preferred embodiments of the invention are illustrated in the towing arrangement connections of the towing aircraft and glider of FIGS. 5 and 6 in which the towing frame has a dual end point pivoting connection to the towing aircraft. Referring first to FIG. 5, the single rotor helicopter 31 connects to a dual point end connection towing frame 30 of which the forward portion comprises two, spaced apart, parallel sidebars 32 of which the forward ends are affixed to and supported by a cross suspension bar 33 of which the center portion has a pivotal supporting connection (not illustrated) to the bottom of the helicopter fuselage 34 permitting rotation of the tow frame 30 in a vertical plane about the transversely extending horizontal axis of the cross suspension bar 33. The rear end portion of each of the tow frame sidebars 32 are attached to and supported by a pair of "steady" arms 35 each hinged to opposite sides of the helicopter tail section in the manner of a swinger link arrangement configured to rotate about the longitudinal hinges on the rear portion of the helicopter tail section. The after portion of the tow frame comprises rear extensions 35 of the sidebars 32 which merge from the steady arms 35 to a single attachment point at which a universal joint 36 pivotally attaches to the glider hook-on point at the mean aerodynamic chord projected along the centerline of the glider wing. This dual point end connecting tow frame 30 with the universal joint connection 36 to the glider 24 is restricted to motion in a vertical plane about its forward axis comprising the cross suspension bar 33 that extends transversely of the helicopter centerline with a pivotal connection to the bottom of the helicopter fuselage.

In FIG. 6, the configuration of the dual point end connecting tow frame 37 for towing a glider 24 by a fixed wing aircraft 38 is essentially the same as that of FIG. 5 in which the towing frame is free to pivot only in a vertical plane about an axis that extends transversely of the towing aircraft centerline. The pair of longitudinally extending, parallel sidebars 39 of the forward portion of the towing frame 37 are separated a distance to clear the tail of the fixed wing aircraft and the forward end of each of the sidebars 39 is hinged by a horizontal pin (not illustrated) to an inboard sidewall of each of the outboard engine nacelles 40, 40a of the aircraft. From a crossbar 43 at the rear ends of the tow frame sidebars 39 extensions of the sidebars are angled inwardly as end extensions 41 forming a triangle which merges into a single point at which a universal joint 36 attaches to the glider hook-on point. As in the tow frame of FIG. 5, the sidebars 39 of the tow frame 37 are stabilized by a pair of steady arms 42 each hingedly affixed to opposite portions of the rear fuselage of the tow aircraft. As in the tow frame of FIG. 5, the tow frame 37 of FIG. 6 is restricted for pivotal motion in a vertical plane around the forward horizontal pin connections to the sidewalls of the engine nacelles.

For an optimum towing arrangement and control system in which forward and rear ends of a towing frame are connected respectively to the towing aircraft and to the glider by means of a freely pivoting universal joint, as schematically illustrated in FIG. 3, the output signals of all fifteen sensors of FIG. 2 integrated by the computer 29 could provide appropriate control signals to the glider aerodynamic control surfaces 25, 26 and 27. However, such an optimum control system utilizing fifteen sensors would not be necessary in many types of operations, particularly when the tow frame has dual forward point pivoting attachments as in the configurations illustrated in FIGS. 5 and 6 in which the tow frame has freedom of pivoting motion only in a vertical plane. The block diagram of FIG. 4 demonstrates the relation between specified primary control sensors, the flight control computer 29 and the aerodynamic control surfaces of the glider for the towing arrangement of the dual point end connection type of towing frame of FIGS. 5 and 6. The dashed rectangle on the left side of FIG. 4 block diagram encompasses the primary control sensors with each group of related sensors being shown separately within a rectangle with connections through the computer 29 that generates signals to the actuators of the glider aerodynamic control surfaces that are indicated within the dashed rectangle on the right. The central dashed rectangle represents the flight control computer 29 which receives the sensory input signals and delivers the appropriate output signals to the glider aerodynamic control surface actuators. Each actuator emits a feed-back signal which nulls out the input signal when the actuator has moved to its commanded position, as is normal in any servo system. The sensor computer actuated automatic flight control system schematically illustrated in FIG. 4 maintains a desired spatial geometric relationship between the towing aircraft and the towed glider by establishing glider motion in the vertical and horizontal planes and about the fore and aft roll axis of the tow frame in the manner subsequently indicated.

Motion in Vertical Plane

In cruising flight the glider should preferably be maintained higher than the towing aircraft in order to be unaffected by the towing aircraft downwash. The angle measured by sensor (2) will then be a positive angle. At equilibrium the downward components of glider weight and towing tension will be balanced by the lift of the glider wing, as determined by air speed and glider angle of attack. Should angle (2) increase, indicating an increase in vertical separation between the towing and towed aircraft, the sensor (2) output signal will, through the flight control computer 29 initiate a deflection/extension of the spoilers 26 on the upper surface of the glider wing and initiate a downward elevator deflection of the ruddervators so as to cause a decrease in the glider lift vector and reduce its angle of attack, which in turn will cause the glider to lose altitude and reestablish the proper trim angle. To enhance the dynamic stability of the system, the rate of change in angle (2) is also sensed by sensor (7) and any rapid rate sensed by sensor (7) will establish an additional signal above that of the signal from sensor (2), thus producing damping in the vertical motion.

During takeoff and landing, the glider will preferably be lower than the towing aircraft. This will be performed at a lower air speed than at cruising speed. Therefore, the air speed sensor (12) will enter into a determination of the boom angle (2), causing it to be a negative angle at takeoff and landing speeds. A low air speed signal will also cause the glider flaperons to be lowered so that takeoff and landing operations can be performed at a lower speed and at a more level glider altitude. The sensed (12) air speed signal will also be used to change the gain on all servo actuators, since the glider flight control surfaces become more effective with increased air speed.

In cruise flight, the drag of the glider will normally create a tensile force in the tow frame. Should the towing aircraft rapidly slow down, tension in the tow frame would decrease and could temporarily establish compression resulting in an increase in angle (2) of the tow frame and increase the vertical separation of the two aircraft. To alleviate such a condition, sensor (11) measures tow frame axial forces, either tension or compression and if compression or decreased tension is sensed, a signal is generated by the computer to extend the glider wing flaps and spoilers to increase the drag of the glider and to return the tow frame axial force to normal tension.

Motion in Horizontal Plane

In the illustrated embodiments of FIGS. 5 and 6, the dual point end connection tow frame has no freedom of motion in yaw at the point of connection to the towing aircraft. Accordingly, the towing aircraft can yaw only about the connecting point of the tow frame to the glider. However, any yawing motion of the towing aircraft about this point would be strongly resisted by the drag of the glider. Thus, towing aircraft turns should be made by rolling the tow aircraft and flying it laterally as is done in helicopter mine-sweeping operations. The resulting yaw angle of the glider relative to the towing aircraft, sensed by sensor (3) at the universal joint connection to the glider, will create a signal deflecting the glider ruddervators as rudders in the direction of reducing the angle (3) to zero. A signal from sensor (8), measuring the rate of change of the glider yaw angle (3) would be added to the signal from the sensor (3) in order to provide damping in yaw.

Motion in Roll

The universal joint at the connection between the tow frame and the glider establishes freedom of the glider to rotate about the longitudinal axis of the towing frame. Sensor (5) measures this rotation, which is the roll angle of the glider relative to the towing aircraft, and sensor (10) measures the rate of change of this angle. The signals from these sensors control the flaperons as ailerons in the direction to reduce the differential roll to zero, resulting in a coordinated turn for the glider as well as establishing damping in roll.

As noted in the preceding discussion with respect to FIG. 4, the dual point connecting tow frame is pivotally supported from the towing aircraft for rotation about a transversely extending axis of the towing aircraft only in the vertical plane and has no freedom of motion in yaw, i.e., angle (4) and angular rate of change (9). Hence, the sensors for these angular displacements would not be activated in the towing frame dual point connection configuration of FIGS. 5 and 6. Since the motion of the glider in the vertical plane is primarily best controlled through operation of the spoilers and flaps, for steady flight conditions representative of the operational discussion with respect to FIG. 4, the elevation angular displacements of the glider with respect to the towing frame sensed by sensors (1) and (6) are not shown as being integrated into the computer output for providing a basic and simplified description of an operable control system operation. Also, the signals (13A) and (13B) with respect to the rates of climb of the aircraft represent signals from sensors that could be used for reference and correlation, but are not utilized in the operational description of FIG. 4. However, integration of signals from the sensors (1), (6), (12B), (13A) and (13B) into the computer for generating optimum operation of the glider flight control surfaces in unstable flight conditions would be obvious to one of normal skill.

In FIG. 7 the towing frame 44 has dual end connections to both the towing aircraft and the glider. The forward section of the towing frame 44 is configured and hingedly connected by horizontal pins (not illustrated) to the outboard engine nacelles of the aircraft 45 in the manner of FIG. 6 by the spaced apart sidebars 46 of the towing frame 44 having steady arms 47 hinged to the after part of the aircraft fuselage with the sidebars continuing in parallel arrangement with the ends of each pivotally connected to the glider hook-on points by horizontal hinge pins 48. In this double dual end point connection tow frame configuration of FIG. 7 the glider has no freedom of motion in yaw with respect to the towing frame. In this configuration the towing frame itself imparts a corrective towing force to the glider in roll and yaw and the functions of sensors (3), (4), (5), (8), (9) and (10), as explained with reference to FIG. 4, would be eliminated. Flight control of a glider with the towing arrangement of FIG. 7 would constitute utilizing the towing aircraft elevation angular displacement sensors (2) and (7) to control the vertical separation of the towing and towed aircraft, although the glider elevation angular displacement sensors (1) and (6) could be integrated into the control system in controlling the glider flight path control surfaces.

As previously noted, a particularly useful aspect of the invention involves utilizing the glider as a source of fuel for the towing aircraft additional to the fuel which the towing aircraft can carry or the glider could be utilized as a tanker from which other aircraft can be refueled in flight as illustrated in FIG. 1 in which a refueling hose 49 is deployed from the glider 24 by which a second helicopter 50 is refueled through its refueling boom 50. When the glider is utilized as an additional source of fuel for the towing aircraft, which is particularly useful when the towing aircraft is a helicopter, a refueling hose (not illustrated) is supported by or incorporated in the structure of the towing frame or could be a separate hose of convenient configuration. The refueling system of a "drinking" towing aircraft would be incorporated into its fuel system design and forms no part of this invention. Provisions for takeoff and, if desired, landing the glider form no part of this invention but obviously can be accomplished by previously known and conventional measures. For the takeoff mode of a glider towed by a fixed wing towing aircraft or a rotary wing aircraft the glider can be supported by its own takeoff gear or in a ground dolly from which the glider is released when takeoff speed is reached. A towing helicopter can take off vertically with the tow frame attached and air-taxi to a starting point for hooking onto the glider or can make a running takeoff of the glider supported by a dolly. Various other obvious procedures are available. If the glider is not disposable it can be landed by remote control operating the control surface actuators.

It should be understood that the foregoing disclosure involves typical embodiments of the invention and that numerous modifications or alterations may be made therein without departing from the spirit and scope of the invention as set forth in the appendant claims.

What is claimed is:

1. A tow control system for controlling the spatial geometric relationship between an airborne, powered towing aircraft and towed glider aircraft having movable aerodynamic flight path control surfaces operable by powered actuating means, said system comprising:
   an elongated rigid towing frame,
   first means pivotally connecting one of said towing frame two ends and the towing aircraft in which pivotal motion of said towing frame is restricted to motion in a vertical plane around a pivotal axis extending transversely of said towing aircraft, second means pivotally connecting the other of said towing frame two ends and the glider aircraft comprising a universal joint permitting relative motion between said towing frame and said glider around all three mutually perpendicular axes of said universal joint, sensor means associated with said towing frame and said aircraft sensing parameter values indicative of the spatial geometric relationship of said glider and towing aircraft, a flight control computer, means linking said sensor means and said flight control computer for transmitting to said computer parameter values sensed by said sensor means, said flight control computer having a program which: (1) determines differences between parameter values indicative of a selected spatial geometric relationship of said glider and towing aircraft and sensor means sensed parameter values transmitted by said linking means and (2) from said determined differences calculates motion required of selected ones of said glider flight path control surfaces to establish a glider flight path that brings said glider and towing aircraft into said selected spatial geometric relationship, means linking said flight control computer and said glider flight path control surface actuating means for transmitting to said actuating means a signal representative of said computer calculated motion required of selected ones of said glider flight path control surfaces, said glider flight path control surfaces including glider upper wing surface spoilers and extendable wing flap surfaces, said sensor means includes a first unit sensing a first parameter value comprising the vertical elevation angle defined between the longitudinal axis of said towing frame and the longitudinal axis of said towing aircraft at said first pivotal connecting means and said flight control computer is programmed such that said calculated motion required of said selected ones of said glider flight path control surfaces comprises: (1) an upward deflection extension motion of said spoilers when the computer determined difference between said first unit sensed parameter value and a selected spatial relationship elevation angle first parameter value is one of an increasing angular relationship above and a decreasing angular relationship below said towing aircraft longitudinal axis and (2) a downward extension of said glider wing flap surfaces when said computer determined difference is one of a decreasing angular relationship above and an increasing angular relationship below said towing aircraft longitudinal axis.

2. A tow control system for controlling the spatial geometric relationship between an airborne, powered towing aircraft ad a towed glider aircraft having movable aerodynamic flight path control surfaces operable by powered actuating means, said system comprising an elongated rigid towing frame, first means pivotally connecting one of said towing frame two ends and the towing aircraft, second means pivotally connecting the other of said towing frame two ends and the glider aircraft, sensor means associated with said towing frame and said aircraft for sensing parameter values determinative of the spatial geometric relationship of said glider and towing aircraft including:
(1) the angle in elevation defined between the longitudinal axis of said towing frame and the longitudinal axis of said towing aircraft at said first pivotal connecting means,
(2) the angle in azimuth defined between the longitudinal axis of the towing frame and the longitudinal centerline of the glider at said second pivotal connecting means,
(3) the roll angle of the towing frame to the glider wing span axis at said second pivotal connecting means,
(4) relative aircraft air speed and
(5) longitudinal tension in said towing frame, a flight control computer, means linking said sensor means and said flight control computer for transmitting to said computer signals of parameter values sensed by said sensing means, said flight control computer having a program which: (1) determines differences between sensor means sensed parameter values determinative of a selected spatial geometric relationship of said glider and towing aircraft and sensor means sensed parameter value signals received from said sensor means linking means and (2) from said determined differences calculates motion required of selected ones of said glider flight path control surfaces to establish a glider flight path that brings said glider and towing aircraft into said selected spatial geometric relationship and means linking said flight control computer and said glider flight path control surface actuating means for transmitting to said actuating means a signal representative of said computer calculated motion required of selected ones of said glider flight path control surfaces.

3. The tow control system of claim 2 wherein said sensor means includes sensing units sensing:
(1) the rate of change in the angle in elevation displaced between the longitudinal axis of said towing frame and the longitudinal axis of said towing aircraft at said first pivotal connecting means,
(2) the rate of change in the angle in asmuth displaced between the longitudinal axis of the towing frame and the longitudinal centerline of the glider at said second pivotal connecting means and
(3) the rate of change of the roll angle between the towing aircraft and the glider wing span at said second pivotal connecting means.

4. In a glider towing system for controlling the spatial relationship of a glider aircraft having aerodynamic control surfaces and a powered towing aircraft interconnected by a rigid tow frame having a first pivotal connection to the towing aircraft at one end and another pivotal connection to the glider at the other end, sensor means associated with said tow frame and aircraft sensing parameter values indicative of the spatial relationship existing between said glider and towing aircraft and glider flight path control means operable by changes in parameter values sensed by said sensor means from corresponding parameter values indicative of a selected spatial relationship between said aircraft for positioning said glider control surfaces as reestablishes said aircraft selected spatial relationship, the improvement wherein:

said sensor means includes a first unit sensing a first parameter value of the vertical elevation angle defined between the longitudinal axes of said tow frame and towing aircraft at said first connection, said glider control surfaces including downwardly extendible wing flaps and upwardly extended wing spoilers and said glider control means includes comparator means determinative of a change in said elevation angle first parameter value from said corresponding first parameter value indicative of said selected aircraft spatial relationship and operable in (1) establishing an extension of said flaps when said determined first parameter elevation angle change is in the direction of an angular decrease of a positive elevation angle and an angular increase of a negative elevation angle and (2) establishing an upward extension of said spoilers when said determined first parameter elevation angle change is in the direction of an angular increase of a positive elevation angle and an angular decrease of a negative elevation angle.

5. In the glider towing system of claim 4 wherein the improvement additionally includes a second sensor unit sensing a second parameter value of the longitudinal stress existing in said tow frame and said glider control comparator means additionally is determinative of a change in said sensed longitudinal towing frame stress second parameter value from a corresponding second parameter value indicative of said aircraft selected spatial relationship and operable in establishing an extension of said flaps and spoilers when said determined second parameter stress change is in the direction of a lesser tensile stress.

6. In the glider towing system of claim 4 wherein the improvement additionally includes a third sensor sensing a third parameter value of the air speed of said aircraft and said glider control comparator means additionally is determinative of change in said sensed air speed from a minimum air speed and is operable in decreasing the degree of glider control surface movement required for re-establishing said aircraft selected spatial relationship when said determined third parameter air speed change is in the direction of an increase and decreasing the degree of said glider control surface movement required for re-establishing said aircraft selected spatial relationship when said third parameter air speed change is in the direction of a decrease.

7. In the glider towing system of claim 5 wherein the improvement additionally includes a third sensor sensing a third parameter value of the air speed of said aircraft and said glider control comparator means additionally is determinative of change in said sensed air speed from a minimum air speed and is operable in decreasing the degree of glider control surface movement required for re-establishing said aircraft selected spatial relationship when said determined third parameter air speed change is in the direction of an increase and decreasing the degree of said glider control surface movement required for re-establishing said aircraft selected spatial relationship when said third parameter air speed change is in the direction of a decrease.

* * * * *